(12) United States Patent
Otani

(10) Patent No.: US 11,875,059 B2
(45) Date of Patent: Jan. 16, 2024

(54) MEMORY SYSTEM AND METHOD OF CONTROLLING NONVOLATILE MEMORY

(71) Applicant: Kioxia Corporation, Tokyo (JP)

(72) Inventor: Hisashi Otani, Kamakura (JP)

(73) Assignee: Kioxia Corporation, Tokyo (JP)

( * ) Notice: Subject to any disclaimer, the term of this patent is extended or adjusted under 35 U.S.C. 154(b) by 39 days.

(21) Appl. No.: 17/654,447

(22) Filed: Mar. 11, 2022

(65) Prior Publication Data

US 2023/0089489 A1    Mar. 23, 2023

(30) Foreign Application Priority Data

Sep. 10, 2021   (JP) .................................. 2021-147660

(51) Int. Cl.
   G06F 3/06          (2006.01)

(52) U.S. Cl.
   CPC .......... G06F 3/0659 (2013.01); G06F 3/0613 (2013.01); G06F 3/0625 (2013.01); G06F 3/0634 (2013.01); G06F 3/0679 (2013.01)

(58) Field of Classification Search
   CPC .... G06F 3/0659; G06F 3/0613; G06F 3/0625; G06F 3/0634; G06F 3/0679
   USPC ........................................................ 711/154
   See application file for complete search history.

(56) References Cited

U.S. PATENT DOCUMENTS

| | | | |
|---|---|---|---|
| 9,317,212 B2 | 4/2016 | Huffman et al. | |
| 10,725,677 B2* | 7/2020 | Shechter | G06F 3/0656 |
| 10,811,060 B2* | 10/2020 | Matsunaga | H04N 1/00896 |
| 2011/0022859 A1* | 1/2011 | More | G06F 1/3203 713/300 |
| 2011/0188675 A1* | 8/2011 | Shimoharada | G06F 1/3287 381/120 |
| 2014/0040645 A1* | 2/2014 | Hiraike | G06F 1/3234 713/320 |
| 2014/0068300 A1* | 3/2014 | Nishijima | G06F 1/3287 713/322 |
| 2015/0241952 A1* | 8/2015 | Asami | G06F 1/3275 713/323 |
| 2015/0362987 A1* | 12/2015 | Shin | G06F 1/324 713/323 |
| 2016/0034221 A1* | 2/2016 | Zettsu | G06F 3/0625 711/103 |
| 2017/0097673 A1* | 4/2017 | Dogbey | G06F 1/3296 |
| 2019/0286219 A1* | 9/2019 | Anazawa | G06F 3/068 |

(Continued)

FOREIGN PATENT DOCUMENTS

JP    2011-113626 A    6/2011

*Primary Examiner* — Christopher B Shin

(74) *Attorney, Agent, or Firm* — Oblon, McClelland, Maier & Neustadt, L.L.P.

(57) ABSTRACT

According to one embodiment, a memory system connectable to a host via each of a first bus and a second bus includes a nonvolatile memory and a controller. The controller stores first data that is necessary for responding to a management command for acquiring a status of the memory system in a first volatile memory before causing the memory system to transition to a low power mode. The controller causes the memory system to transition to the low power mode by stopping supply of power to each of components of the controller except for a first interface circuit connected to a first bus, a second interface circuit connected to a second bus, and the first volatile memory, and stopping the supply of power to the nonvolatile memory.

11 Claims, 10 Drawing Sheets

(56) References Cited

U.S. PATENT DOCUMENTS

2020/0409602 A1* 12/2020 Lee .................... G06F 12/0246
2022/0300158 A1* 9/2022 Kushida ................ G06F 3/0653

* cited by examiner

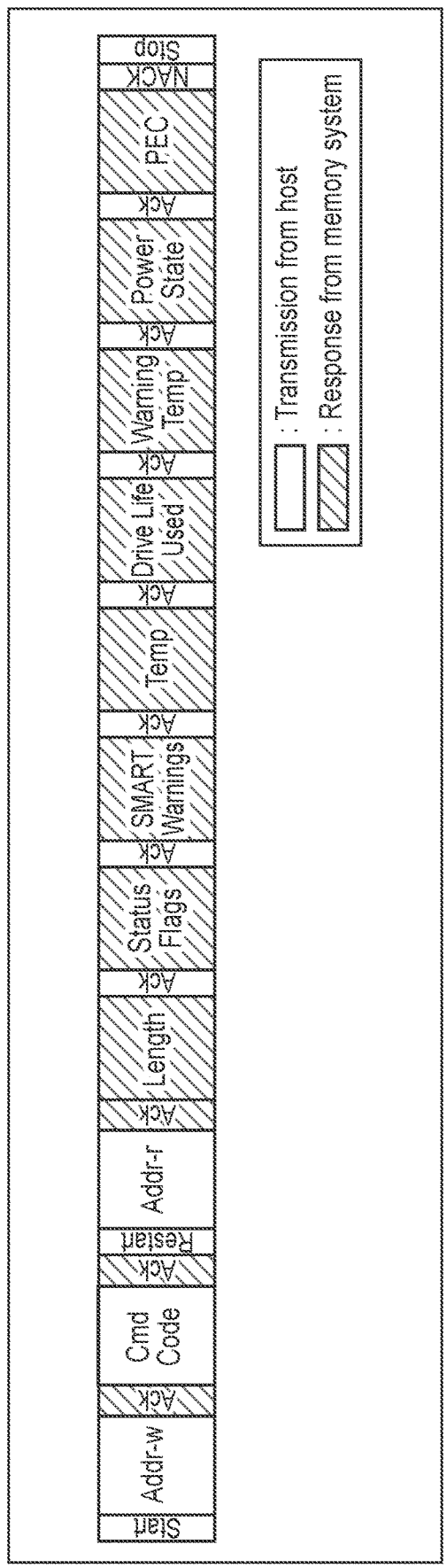
F I G. 3

| Power state | operational /non-operational state | Hardware in memory system | Power consumption |
|---|---|---|---|
| first power state PS0 | operational state | All hardware is powered on | ⬅ High / Low ➡ |
| second power state PS1 | | | |
| third power state PS2 | | | |
| fourth power state PS3 | non-operational state | Almost all hardware is powered on | |
| fifth power state PS4 | | Only part of hardware is powered off (nonvolatile memory 5 is powered on) | |
| sixth power state PS5 | | Almost all hardware is powered off (nonvolatile memory 5 is powered off) | |

F I G. 4

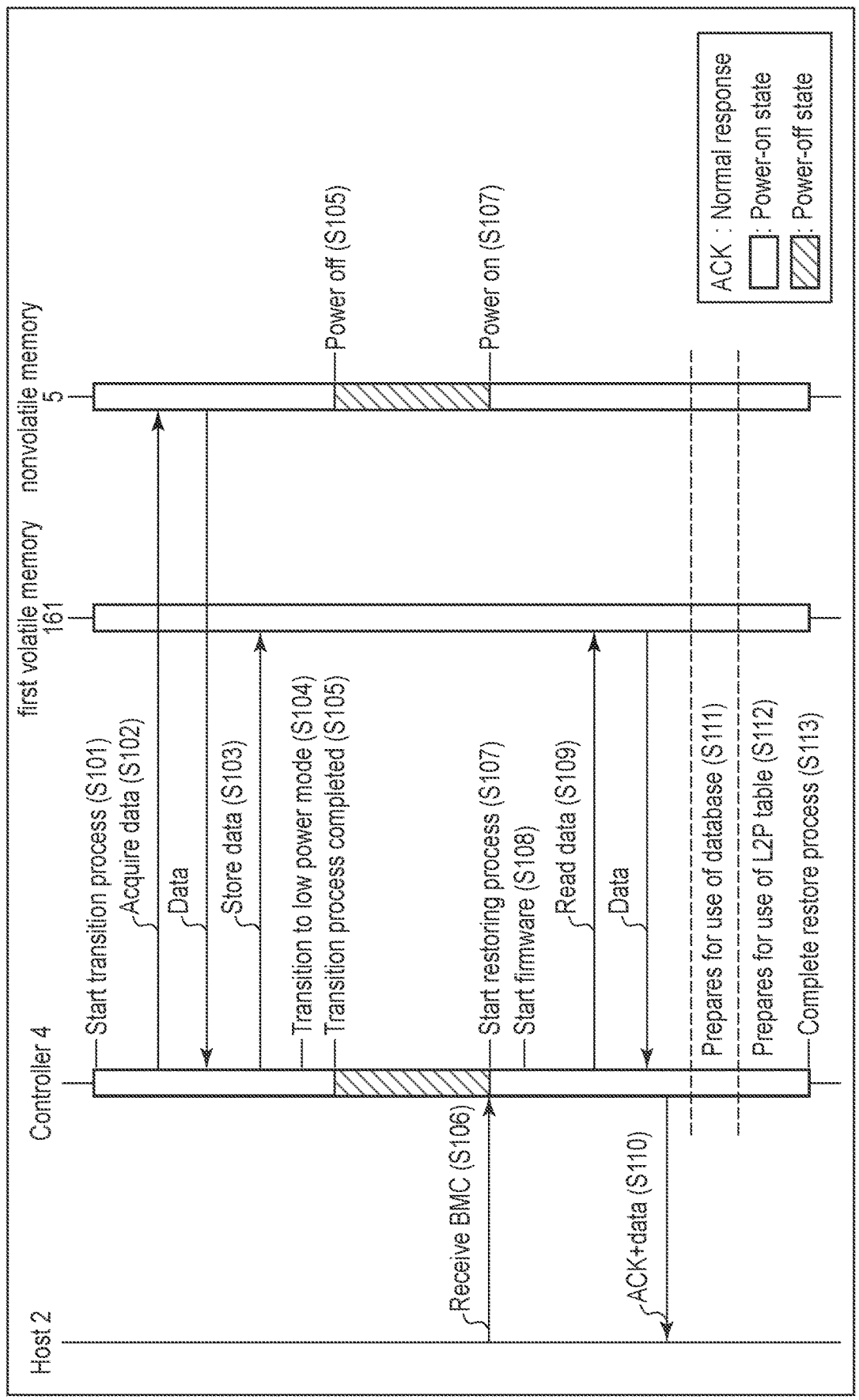
F I G. 5

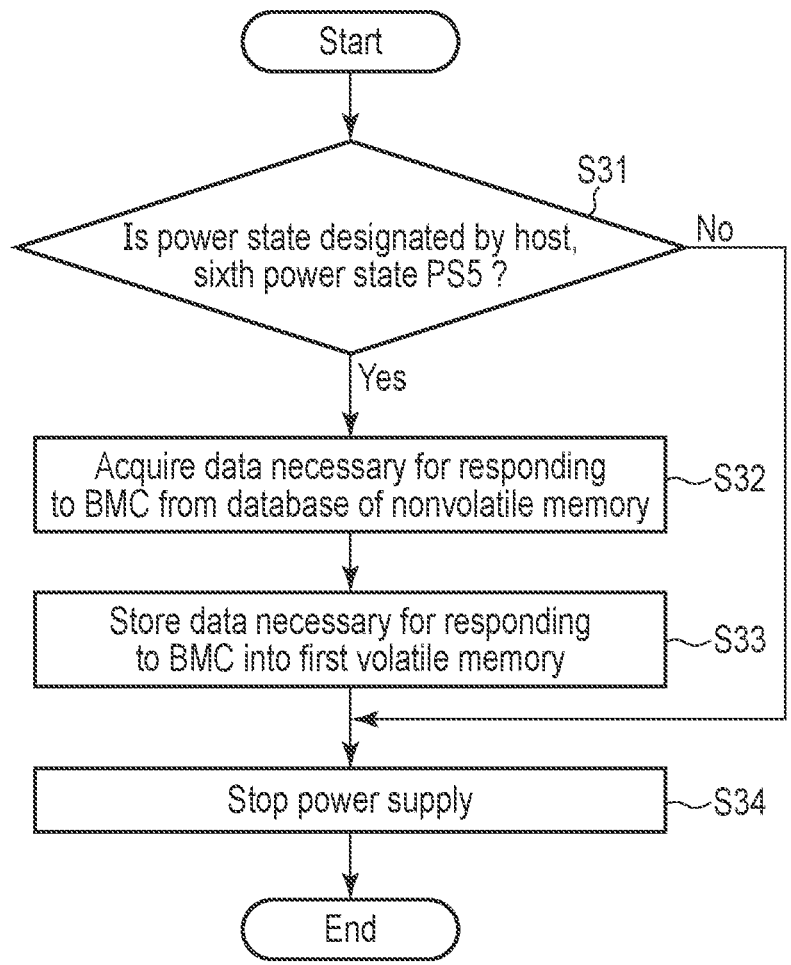
F I G. 7

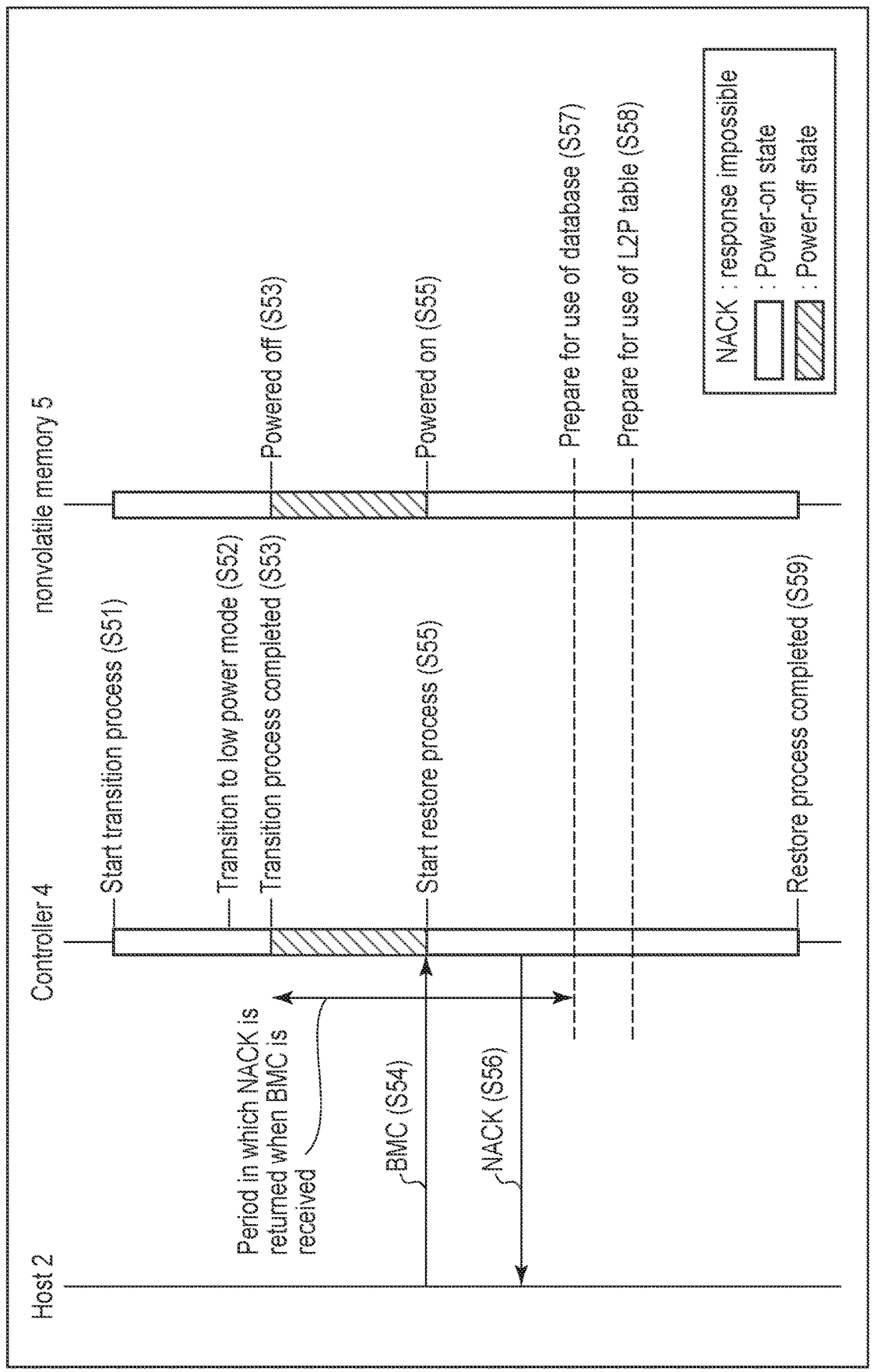
F I G. 9

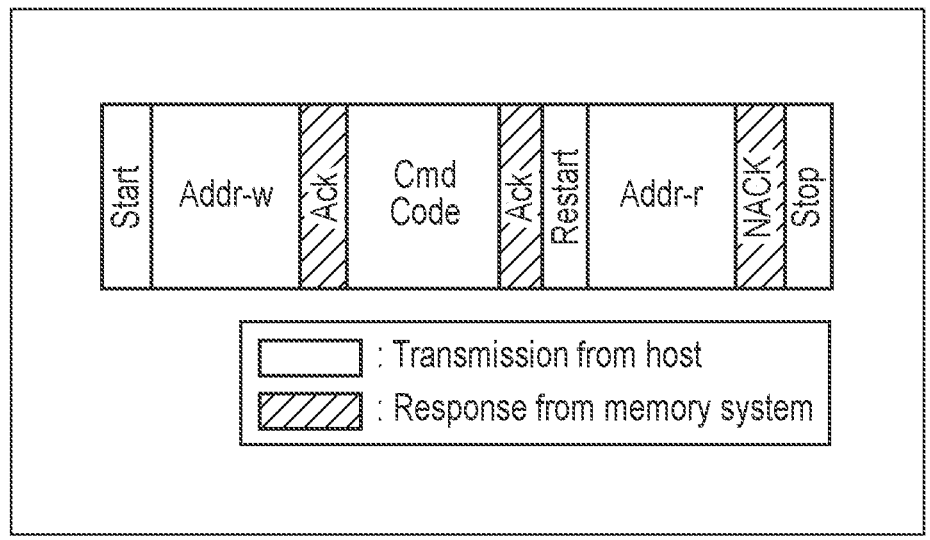
F I G. 10

MEMORY SYSTEM AND METHOD OF CONTROLLING NONVOLATILE MEMORY

CROSS-REFERENCE TO RELATED APPLICATIONS

This application is based upon and claims the benefit of priority from Japanese Patent Application No. 2021-147660, filed Sep. 10, 2021, the entire contents of which are incorporated herein by reference.

FIELD

Embodiments described herein relate generally to a memory system and a method of controlling a nonvolatile memory.

BACKGROUND

In recent years, memory systems for controlling nonvolatile memories have been widely used. As one of such memory systems, solid state drives (SSDs) each implemented with a NAND flash memory have been known. SSDs have been used in various computers.

In a memory system such as an SSD, a technology for responding to a command for acquiring a status of the memory system is required even in a status in which the memory system is a low power mode.

BRIEF DESCRIPTION OF THE DRAWINGS

FIG. 3 is a schematic diagram illustrating basic management command transmitted from a host and a structure of data transmitted from the memory system according to the embodiment of the present invention.

FIG. 4 is a schematic diagram illustrating a plurality of power states in which the memory system according to the embodiment of the present invention can transition and characteristics thereof.

FIG. 5 is a sequence diagram illustrating a transition process and a restore process executed in the memory system according to the embodiment of the present invention.

FIG. 7 is a flowchart illustrating a procedure of process to be executed in the memory system before transitioning to a low power mode according to the embodiment of the present invention.

FIG. 9 is a sequence diagram illustrating a transition process and a restore process to be executed in a memory system according to a comparative example.

FIG. 10 is a schematic diagram illustrating basic management command transmitted from a host according a comparative example and NACK transmitted from the memory system according to the comparative example.

DETAILED DESCRIPTION

Various embodiments will be described hereinafter with reference to the accompanying drawings.

In general, according to one embodiment, a memory system connectable to a host via each of a first bus and second bus comprises a nonvolatile memory and a controller. The controller executes, via the first bus, communication related to an I/O command with the host for writing or reading data to or from nonvolatile memory. The controller executes, via the second bus, communication related to a management command with the host for acquiring status of the memory system. The controller acquires, from the nonvolatile memory, first data that is necessary for responding to a management command for acquiring a status of the memory system before causing the memory system to transition from a normal mode in which the I/O command and the management command received from the host are processed to a low power mode in which the I/O command and the management command are not processed, the first data indicating the status of the memory system, and stores the acquired first data in a first volatile memory included in the controller. The controller causes the memory system to transition from the normal mode to the low power mode by stopping supply of power to each of components of the controller except for a first interface circuit that communicates with the host via the second bus, and the first volatile memory and stopping the supply of power to the nonvolatile memory after storing the acquired first data in the first volatile memory. When the management command is received by the second interface circuit via the second bus while the memory system is in the low power mode, the controller starts a process of restoring the memory system to the normal mode by restarting the supply of power to each of the components of the controller and the supply of power to the nonvolatile memory. When the controller becomes accessible to the first volatile memory, the controller reads the first data from the first volatile memory and transmits the read first data to the host over the second bus.

Figure 1:
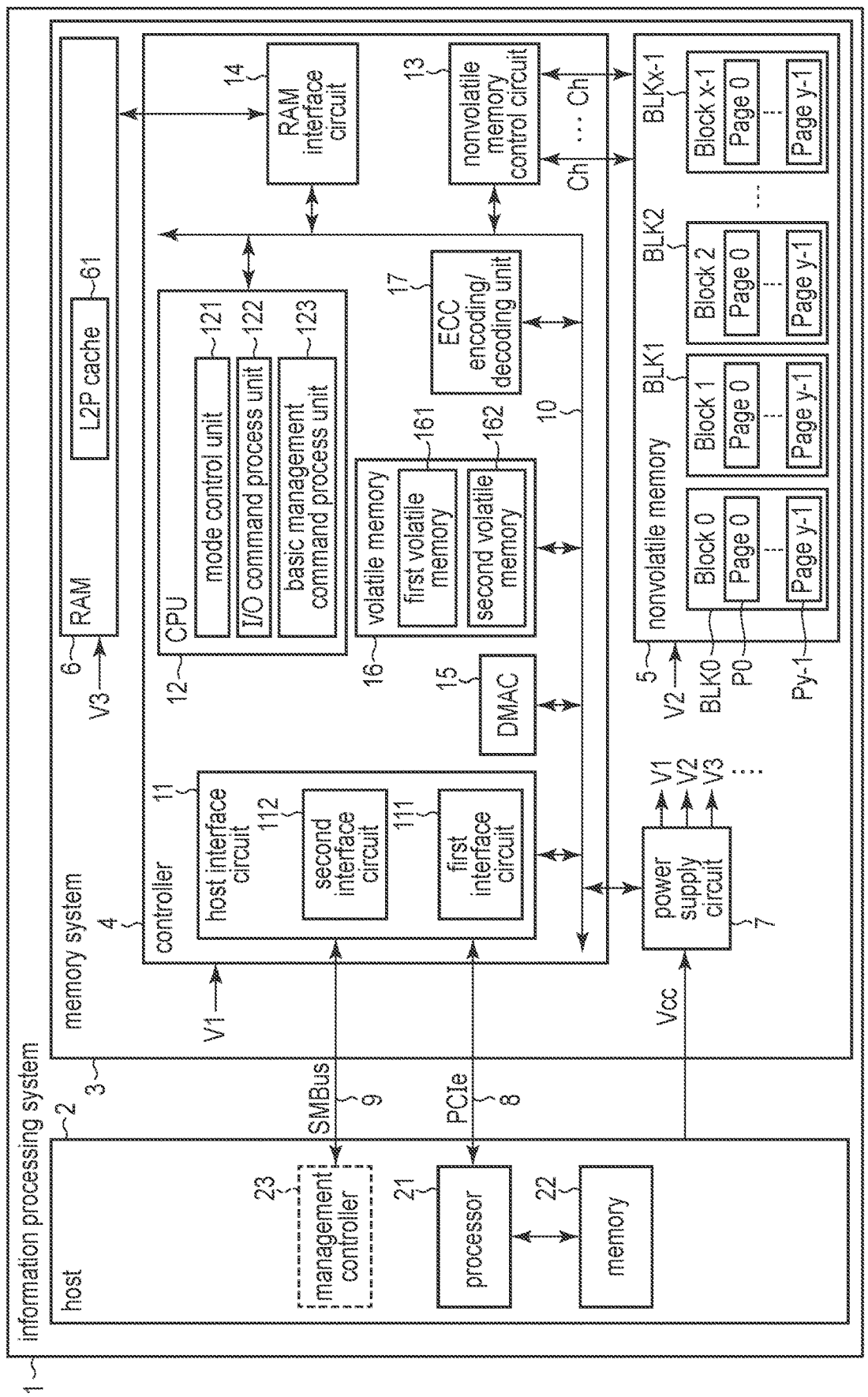
FIG. 1 is a block diagram illustrating an example of a configuration of an information processing system including a memory system according to an embodiment of the present invention.

First, a configuration of a memory system according to an embodiment of the present invention will be described. FIG. 1 is a block diagram illustrating an example of a configuration of an information processing system including a memory system according to an embodiment of the present invention. An information processing system 1 includes a host (host device) 2 and a memory system 3.

The host 2 is an information processing apparatus that accesses to the memory system 3. The host 2 is, for example, a personal computer or a server computer. The host 2 transmits a write command, which is a command for writing data, to the memory system 3. The host 2 transmits a read command, which is a command for reading data, to the memory system 3.

The memory system 3 is a storage device. The memory system 3 is, for example, an SSD including a NAND flash memory. The memory system 3 can be connected to the host 2 via each of a first bus 8 and a second bus 9.

The first bus 8 is mainly used for transmitting an I/O command from the host 2 to the memory system 3 and transmitting a response from the memory system 3 to the host 2. The I/O command is a command for writing or reading data to or from a nonvolatile memory. Examples of the I/O command include a write command and a read command.

The second bus 9 is mainly used for transmitting a management command from the host 2 to the memory system 3 and transmitting a response from the memory system 3 to the host 2. The management command is a command for acquiring a status of the memory system 3.

Communication between the host 2 and the memory system 3 via the first bus 8 is executed in accordance with, for example, a NVM Express™ (NVMe™) standard. In this case, the first bus 8 is, for example, a PCI Express™ bus (PCIe™ bus). Examples of the command transmitted from the host 2 via the PCIe bus include an NVM command and an admin command. The NVM command includes an I/O command such as a write command and a read command. The admin command includes, for example, an identify command and a set feature command. The identify command is a command for acquiring a data structure indicating a capability or a characteristic of the memory system 3. The set feature command is a command for setting or changing a function of the memory system 3.

Communication between the host 2 and the memory system 3 via the second bus 9 is executed in accordance with, for example, a NVM Express™ Management Interface (NVMe™-MI) standard. In this case, the second bus 9 is, for example, a system management bus (SMBus). The SMBus is a two-wire interface defined by a system management bus standard. The management command transmitted from the host 2 via the SMBus is, for example, a basic management command (BMC) defined in the NVMe-MI standard. The BMC is a command for acquiring data indicating some predetermined statuses of the memory system 3 from the memory system 3. In addition, communication between the host 2 and the memory system 3 via the second bus 9 is executed by using a block read protocol defined by the SMBus standard. The block read protocol is a data read protocol executed via the SMBus.

Next, an internal configuration of the host 2 will be described. The host 2 includes a processor 21 and a memory 22. In addition, the host 2 may further include a management controller 23. In addition, the host 2 may further include a storage device (not illustrated).

The processor 21 is a central processing unit (CPU) configured to control each component of the host 2. The processor 21 communicates with the memory system 3 via the first bus 8. The processor 21 executes software (host software) loaded into the memory 22. The host software is loaded into the memory 22 from the memory system 3 or the storage device of the host 2. The host software includes an operating system, a file system, a device driver, an application program, and the like.

The memory 22 is a volatile memory. The memory 22 is, for example, a random access memory such as a dynamic random access memory (DRAM).

The management controller 23 is, for example, hardware that can operate independently of an operating system executed by the processor 21. The management controller 23 monitors the operation of the memory system 3 and manages the status of the memory system 3. The management controller 23 transmits a management command such as a BMC to the memory system 3 via the second bus 9.

Next, an internal configuration of the memory system 3 will be described. The memory system 3 includes a controller 4, a nonvolatile memory 5, a random access memory (RAM) 6, and a power supply circuit 7.

The controller 4 is a memory controller configured to control the nonvolatile memory 5. The controller 4 is, for example, a control circuit such as a system-on-a-chip (SoC). The controller 4 is communicatively connected to the nonvolatile memory 5. The controller 4 executes communication with external devices via each of the first bus 8 and the second bus 9. More specifically, the controller 4 executes communication related to the I/O command via the first bus 8. In addition, the controller 4 executes communication related to the management command via the second bus 9.

The nonvolatile memory 5 is a nonvolatile memory. The non-volatile memory 5 is, for example, a NAND flash memory. The nonvolatile memory 5 is, for example, a flash memory having a two-dimensional structure or a flash memory having a three-dimensional structure. Alternatively, the nonvolatile memory 5 may be a magnetoresistive random access memory (MRAM), a phase change random access memory (PRAM), a resistive random access memory (ReRAM), or a ferroelectric random access memory (FeRAM).

A RAM 6 is a volatile memory. The RAM 6 is, for example, a dynamic RAM (DRAM). A part of the storage area of the RAM 6 is used, for example, as a logical-to-physical address translation table (L2P table) cache 61. The L2P table cache 61 is a cache that stores a part of the logical-to-physical address translation table (L2P table) 53 stored in the nonvolatile memory 5.

The power supply circuit 7 is a circuit that supplies power to each of the controller 4, nonvolatile memory 5, and RAM 6. The power supply circuit 7 generates power (power supply voltage V1) to be supplied to the controller 4, power (power supply voltage V2) to be supplied to the nonvolatile memory 5, and power (power supply voltage V3) to be supplied to the RAM 6 by using power (power supply voltage Vcc) supplied from the outside.

Next, an internal configuration of the controller 4 will be described. The controller 4 includes a host interface circuit 11, a CPU 12, a nonvolatile memory control circuit 13, a RAM interface circuit 14, a direct memory access controller (DMAC) 15, a volatile memory 16, and an ECC encoder/decoder 17. The host interface circuit 11, the CPU 12, the nonvolatile memory control circuit 13, the RAM interface circuit 14, the DMAC 15, the volatile memory 16, and the ECC encoder/decoder 17 are connected to an internal bus 10. The power supply circuit 7 is also connected to the internal bus 10.

The host interface circuit 11 is a hardware interface that executes communication with external devices. The host interface circuit 11 receives various commands from the host 2. The various commands are, for example, an I/O command and a management command. The management command is, for example, a BMC.

The CPU 12 is a processor. The CPU 12 controls the host interface circuit 11, the nonvolatile memory control circuit 13, the RAM interface circuit 14, the DMAC 15, the volatile memory 16, and the ECC encoder/decoder 17. The CPU 12 performs various processes by executing a control program (firmware). The CPU 12 loads a control program (firmware) from a ROM (not illustrated) or the nonvolatile memory 5 to the volatile memory 16 or the RAM 6 according to supply of power to the memory system 3. The CPU 12 executes management of data stored in the nonvolatile memory 5 and management of blocks included in the nonvolatile memory 5 as a flash translation layer (FTL). The management of the data stored in the nonvolatile memory is, for example, management of mapping information indicating a correspondence relation between each logical address and each physical address. The logical address is an address used by the host 2 to access the memory system 3. The logical address is, for example, a logical block address (LBA). The physical address indicates a physical storage location included in the nonvolatile memory 5. The management of the blocks included in the nonvolatile memory 5 includes, for example, management of defective blocks (bad blocks) included in the nonvolatile memory 5, wear leveling, and garbage collection.

The nonvolatile memory control circuit 13 is a circuit that controls a plurality of nonvolatile memory chips. The nonvolatile memory control circuit 13 may be, for example, connected to the plurality of nonvolatile memory chips via a plurality of channels (Ch).

The RAM interface circuit 14 is a circuit that controls the RAM 6. The RAM interface circuit 14 is, for example, a circuit that controls a DRAM.

The DMAC 15 is a circuit that executes direct memory access (DMA). The DMAC 15 executes data transfer between the memory 22 of the host 2 and the volatile memory 16 (or RAM 6).

The volatile memory 16 is a volatile memory. The volatile memory 16 is, for example, a static random access memory (SRAM). A part of the storage area of the volatile memory 16 is used as a write buffer to temporarily store data to be written to the nonvolatile memory 5. When the supply of power to the volatile memory 16 is stopped, the stored content in the volatile memory 16 is lost.

The ECC encoder/decoder 17 is a circuit that executes ECC encoding and ECC decoding. The ECC encoder/decoder 17 adds an error correction code (ECC) as a redundant code to user data by encoding the user data before the user data is written to the non-volatile memory 5 (ECC encoding). When the user data is read from the non-volatile memory 5, the ECC encoder/decoder 17 performs error correction of the user data using the ECC added to the read user data (ECC decoding).

Next, an internal configuration of the nonvolatile memory 5 will be described. The nonvolatile memory 5 includes a plurality of blocks BLK0 to BLKx-1. Each of the blocks BLK0 to BLKx-1 is a unit for a data erase operation. The data erase operation is an operation of erasing data. Each of the blocks BLK0 to BLKx-1 is also referred to as a physical block, an erase block, a flash block, or a memory block. Each of the blocks BLK0 to BLKx-1 includes a plurality of pages, which are pages P0 to Py-1. Each of the pages P0 to Py-1 is a unit for a data write operation and a data read operation. The data write operation is an operation for writing data. The data read operation is an operation for reading data. Each of the pages P0 to Py-1 includes a plurality of memory cells connected to a same word line.

Next, an internal configuration of the host interface circuit 11 will be described. The host interface circuit 11 includes a first interface circuit 111 and a second interface circuit 112.

The first interface circuit 111 is a hardware interface. The first interface circuit 111 is connected to the first bus 8. The first interface circuit 111 communicates with an external device via the first bus 8. The first interface circuit 111 is, for example, a PCIe interface circuit that communicates with the external device via the PCIe bus in accordance with an NVMe standard.

The second interface circuit 112 is a hardware interface. The second interface circuit 112 is connected to the second bus 9. The second interface circuit 112 communicates with an external device via the second bus 9. The second interface circuit 112 is, for example, an SMBus interface circuit that communicates with an external device via an SMBus in accordance with the NVMe-MI standard.

Next, a functional configuration of the CPU 12 will be described. The CPU 12 includes a mode control unit 121, an I/O command process unit 122, and a basic management command process unit 123. Some or all of the mode control unit 121, the I/O command process unit 122, and the basic management command process unit 123 may be realized by hardware of the controller 4.

The mode control unit 121 executes a transition process. The transition process is a process for transitioning the memory system 3 from a normal mode to a low power mode. In addition, the mode control unit 121 executes a restore process. The restore process is a process for restoring the memory system 3 from the low power mode to the normal mode. The normal mode is a status in which the I/O command, and the management command such as a BMC are processed. This status is referred to as an operational state. The low power mode is a status in which the I/O command and the management command such as the BMC are not processed. This status is referred to as a nonoperational state. In the low power mode, the supply of power to almost all hardware of the memory system 3 except for some hardware required to be restored to the normal mode is stopped. Some hardware required to be restored to the normal mode is, for example, the first interface circuit 111 and the second interface circuit 112. In addition, the supply of power to the nonvolatile memory and the supply of power to the RAM 6 are also stopped. As a result, the power consumed by the memory system 3 during the low power mode can be reduced.

The I/O command process unit 122 executes a process related to an I/O command received via the first bus 8. Specifically, the I/O command process unit 122 executes process related to a write command, a read command, and the like.

The basic management command process unit 123 executes process related to the management command received via the second bus 9. The management command received via the second bus 9 is, for example, a BMC.

Next, an internal configuration of the volatile memory 16 will be described. The volatile memory 16 includes a first volatile memory 161 and a second volatile memory 162. The first volatile memory 161 is a memory area in which the supply of power is maintained even in the low power mode. The second volatile memory 162 is a memory area in which the supply of power is stopped during the low power mode.

Figure 2:
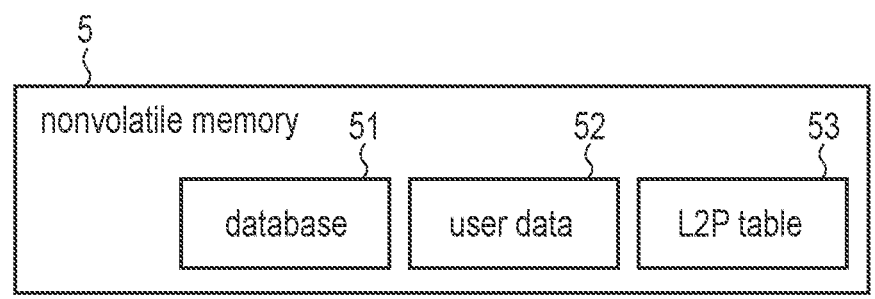
FIG. 2 is a block diagram illustrating data stored in a nonvolatile memory included in the memory system according to the embodiment of the present invention.

Next, data stored in the nonvolatile memory 5 will be described. FIG. 2 is a diagram illustrating data stored in the nonvolatile memory 5 included in the memory system 3 according to the embodiment of the present invention. The data stored in the nonvolatile memory 5 includes a database 51, user data 52, and an L2P table 53.

The database 51 is a set of data having a searchable data structure. The database 51 includes various management data such as data indicating a status of the memory system 3. The database 51 also includes data necessary for responding to the management command such as a BMC. An example of data required for responding to the BMC will be described later with reference to FIG. 3.

The user data 52 is data received by the memory system 3 in association with a write command.

The L2P table 53 is a table that holds a correspondence relation between a logical address included in the write command and a physical address.

Next, the basic management command and data necessary for responding to the basic management command will be described. FIG. 3 is a schematic diagram illustrating basic management command transmitted from a host and a structure of data transmitted from the memory system according to the embodiment of the present invention. In FIG. 3, areas not hatched indicate commands transmitted from the host 2. Hatched areas indicate responses from the memory system 3.

The host 2 transmits the basic management command to the memory system 3 via the second bus 9. The basic management command includes "Start", address write "Addr-w", command code "Cmd Code", repeated start "Restart", and address read "Addr-r".

The "Start" is a code indicating a start of the block read protocol. The address write "Addr-w" subsequent to "Start" is a device address allocated to the memory system 3. The command code "Cmd Code" is a command code of the basic management command. The repeated start "restart" is a code indicating switching from a write cycle to a read cycle.

Each time each of the address write "Addr-w", the command code "Cmd Code", and the address read "Addr-r" is received, the controller 4 of the memory system 3 transmits an acknowledge (ACK) to the host 2. Then, after transmitting a third acknowledgement (ACK), that is, an ACK for the address read "Addr-r", the controller 4 transmits data necessary for responding to the basic management command to the host 2. Data necessary for responding to the basic management command is data indicating the status of the memory system 3.

When transmitting data indicating the status of the memory system 3, the controller 4 first transmits "Length" to the host 2. The "Length" indicates a length of data indicating the status of the memory system 3. When the length of data indicating the status of the memory system 3 is, for example, 6 bytes, "Length" indicates 06h. Here, h represents a hexadecimal notation.

The data indicating the status of the memory system 3 includes "Status Flags", "SMART Warnings", "Drive Life Used", "Warning Temp", and "Power State".

The "Status Flags" is data including a plurality of flags each indicating a status of the memory system 3. The "SMART Warnings" is data including a part of smart/health information log defined in the NVMe standard. The "Temp" is temperature data indicating a current temperature of the memory system 3 in Celsius. The current temperature of the memory system 3 is a temperature measured by a temperature sensor provided in the memory system 3. While the memory system 3 is in the low power mode, the database 51 including data indicating the status of the memory system 3 is not updated. Therefore, when only a temperature at a time point in a predetermined period before the current time point can be reported to the host 2, the value of "Temp" is set to 80 h. The 80 h indicates that the temperature data cannot be reported because the temperature data is older than a predetermined period.

The "Drive Life Used" is data indicating an estimated value of the proportion of a used life of the nonvolatile memory 5. The estimated value of the proportion of the used life is obtained, for example, based on an actual usage rate of the nonvolatile memory 5. The "Warning Temp" is data indicating a threshold to warn of temperature excess in Celsius. The "Power State" is data indicating a current power consumption of the memory system 3.

After transmitting the "Power State", the controller 4 transmits "PEC" to the host 2. The "PEC" is a packet error code. The "PEC" is calculated from all the bytes transferred between the host 2 and the memory system 3 after transmission of the "Start".

Each time "Length", "Status Flags", "SMART Warnings", "Drive Life Used", "Warning Temp", or "Power State" is received, the host 2 transmits an ACK to the memory system 3. When receiving "PEC", the host 2 transmits a non-acknowledge (NACK) and "Stop" to the memory system 3. Accordingly, the host 2 terminates the block read protocol.

Next, some power states of the memory system 3 will be described. FIG. 4 is a schematic diagram illustrating a plurality of power states and characteristics thereof of the memory system 3 according to the embodiment of the present invention.

The memory system 3 can use six types of power states (first power state PS0 to sixth power state PS5) each having different power consumption. The six types of power states are given consecutive numbers. The numbers start with O. Power consumed in each power state with a subsequent number is less than or equal to power consumed in a power state with a preceding number.

The first power state PS0, the second power state PS1, and the third power state PS2 are power states that can be used as the normal mode by the memory system 3. Since the first power state PS0, the second power state PS1, and the third power state PS2 are power states corresponding to the operational state, they are referred to as operational power states. The fourth power state PS3, the fifth power state PS4, and the sixth power state PS5 are power states that can be used as a low power mode by the memory system 3. The fourth power state PS3, the fifth power state PS4, and the sixth power state PS5 are power states corresponding to a non-operational state, and thus are referred to as non-operational power states.

The first power state PS0 is a power state corresponding to the operational state of the memory system 3. In the first power state PS0, power is supplied to all hardware in the memory system 3.

The second power state PS1 is a power state corresponding to the operational state. Power consumed by the memory system 3 in the second power state PS1 is less than the power consumed by the memory system 3 in the first power state PS0.

The third power state PS2 is a power state corresponding to the operational state. Power consumed by the memory system 3 in the third power state PS2 is less than the power consumed by the memory system 3 in the second power state PS1.

The fourth power state PS3 is a power state corresponding to the non-operational state of the memory system 3. The memory system 3 in the non-operational state cannot execute at least processing related to the I/O command. While the memory system 3 is in the fourth power state PS3, operation of almost all hardware in the memory system 3 is stopped. However, during the fourth power state PS3, power is supplied to almost all hardware in the memory system 3. For example, the supply of power to the nonvolatile memory 5 is maintained. Therefore, the database 51 is maintained in a usable status. The power consumed by the memory system 3 in the fourth power state PS3 is less than the power consumed by the memory system 3 in the third power state PS2.

The fifth power state PS4 is a power state corresponding to the non-operational state. While the memory system 3 is in the fifth power state PS4, only the supply of power to some hardware in the memory system 3 is stopped. For example, the supply of power to the nonvolatile memory 5 is maintained. Therefore, the database 51 is maintained in a usable status. Power consumed by the memory system 3 in the fifth power state PS4 is less than the power consumed by the memory system 3 in the fourth power state PS3.

The sixth power state PS5 is a power state corresponding to the non-operational state. While the memory system 3 is in the sixth power state PS5, the supply of power to almost all hardware in the memory system 3 except for some hardware necessary for the restore process to the normal mode is stopped. For example, the supply of power to the nonvolatile memory 5 and the supply of power to the RAM 6 are stopped. In addition, the supply of power to each of other components of the controller 4 except for the first interface circuit 111, the second interface circuit 112, and the first volatile memory 161 is stopped. Power consumed by the memory system 3 in the sixth power state PS5 is less than the power consumed by the memory system 3 in the fifth power state PS4.

Next, a process of transitioning the memory system 3 to the low power mode will be described. For example, when the transition to the low power mode (for example, the sixth power state PS5) is instructed by the set feature command received via the first bus 8, the controller 4 causes the memory system 3 to transition to the sixth power state PS5.

In addition, the transition process to the low power mode (for example, the power state PS5) can be performed using an autonomous power state transition (APST) function defined in the PCIe standard. In this case, the controller 4 causes the power state of the memory system 3 to automatically transition to the sixth power state PS5 on condition that a time of an idle status in which there is no unprocessed command has reached a certain time (threshold time for APST).

The host 2 can acquire a data structure indicating all the power states usable by the memory system 3 and characteristics thereof by transmitting the identify command to the memory system 3. Then, based on the acquired data structure, the host 2 can designate any one of the fourth power state PS3, the fifth power state PS4, and the sixth power state PS5, which are non-operational power states, as the power state for the low power mode.

Furthermore, the host 2 can designate a threshold time for APST by transmitting a set feature command to the memory system 3.

When transition to the low power mode (sixth power state PS5) is instructed by the set feature command, the controller 4 starts the transition process from the normal mode to the low power mode (sixth power state PS5). In addition, when the time of the idle status reaches a threshold time designated in advance by the host 2, the controller 4 also starts the transition process from the normal mode to the low power mode (sixth power state PS5).

Next, processing for restoring the memory system 3 from the low power mode to the normal mode will be described. When receiving the management command or the I/O command while the memory system 3 is in the low power mode, the controller 4 starts processing of restoring the memory system 3 from the low power mode to the normal mode. In this case, the first interface circuit 111, the second interface circuit 112, and the power supply circuit 7 operate as follows.

When receiving a management command such as a BMC while the memory system 3 is in the low power mode, the second interface circuit 112 transmits a wake-up signal to the power supply circuit 7. The wake-up signal is a signal for instructing the memory system 3 to restart the supply of power. When the wake-up signal is received from the second interface circuit 112 while the memory system 3 is in the low power mode, the power supply circuit 7 restarts the supply of power to each hardware in the controller 4, supplying power to the nonvolatile memory 5, and supplying power to the RAM 6, to which the supply of power has been stopped.

When receiving the I/O command while the memory system 3 is in the low power mode, the first interface circuit 111 transmits the wake-up signal to the power supply circuit 7. Similarly, when the wake-up signal is received from the first interface circuit 111 while the memory system 3 is in the low power mode, the power supply circuit 7 restarts the supply of power to each hardware in the controller 4, supplying power to the nonvolatile memory 5, and supplying power to the RAM 6, to which the supply of power has been stopped.

Next, a response process to the management command executed in the memory system 3 according to the embodiment of the present invention will be described.

FIG. 5 is a sequence diagram illustrating the transition process and the restore process executed in the memory system according to the embodiment of the present invention.

When the transition to the low power mode (sixth power state PS5) is instructed by the set feature command received via the first bus 8, the controller 4 starts the transition process (S101). The transition process also starts when the time of the idle status reaches the threshold time. The threshold time is a time designated in advance by the host 2 as a condition for transitioning to the low power mode (sixth power state PS5).

Before actually causing the memory system 3 to transition to the low power mode, the controller 4 acquires data necessary for responding to the basic management command from the database 51 of the nonvolatile memory 5 (S102). The acquired data is, for example, "Status Flags", "SMART Warnings", "Drive Life Used", "Warning Temp", or "Power State".

Then, the controller 4 stores the acquired data in the first volatile memory 161 (S103).

After storing the acquired data in the first volatile memory 161, the controller 4 causes the memory system 3 to transition to the low power mode (S104). In this case, the controller 4 controls the power supply circuit 7 so that the supply of power to almost all hardware in the memory system 3 including the nonvolatile memory 5 is stopped.

When the transition process to the low power mode is completed (S105), the supply of power to almost all the components of the controller 4 except for the first interface circuit 111, the second interface circuit 112, and the first volatile memory 161 is stopped. In addition, the supply of power to the nonvolatile memory 5 and the supply of power to the RAM 6 are also stopped. The supply of power to the first volatile memory 161 is maintained. Therefore, the first volatile memory 161 is maintained in a status in which data indicating the status of the memory system 3 can be immediately read out.

Thereafter, when the BMC is received by the second interface circuit 112 (S106), the controller 4 starts processing of restoring the memory system 3 to the normal mode (S107). The controller 4 controls the power supply circuit 7 so that the supply of power to almost all hardware in the memory system 3 including the nonvolatile memory 5 is restarted. As a result, power is supplied to all the components of the controller 4. The supply of power to the nonvolatile memory 5 is restarted.

When power is supplied to the controller 4, the CPU 12 of the controller 4 loads firmware. Then, the CPU 12 starts the loaded firmware (S108). During the low power mode, the supply of power to the first volatile memory 161 was maintained. Therefore, immediately after the CPU 12 starts the firmware, the controller 4 can access the first volatile memory 161 under the control of the CPU 12.

When the controller 4 becomes accessible to the first volatile memory 161, the controller 4 reads data required for responding to the BMC from the first volatile memory 161 (S109).

As a response to the BMC received in S106, the controller 4 transmits an ACK indicating a normal response and the data acquired in S109 to the host 2 via the second bus 9 such as a SMBus (S110).

After transmitting the data indicating the status of the memory system 3 to the host 2, the controller 4 prepares for use of the database 51 (S111). The controller 4 makes the database 51 available for use by acquiring information on a physical storage location where the database 51 is stored.

Then, the controller 4 prepares for use of the L2P table 53 (S112). The controller 4 makes the L2P table available for use by acquiring information on the physical storage location where the L2P table 53 is stored.

When the preparation for use of the database 51 and the preparation for use of the L2P table 53 are completed, the controller 4 completes the restore process (Step S113).

As described above, the controller 4 reads the data indicating the status of the memory system 3 not from the database 51 in the nonvolatile memory 5 but from the first volatile memory 161. As a result, the controller 4 can acquire the data indicating the status of the memory system 3 in a shorter time than that when reading the data from the database 51 in the nonvolatile memory 5. In the SMBus standard, it is required to return a response within a time limit (timeout period) from reception of a command. When controller 4 receives the BMC while transitioning to the low power mode, the controller 4 can transmit data indicating the status of the memory system 3 as a response to the BMC within the timeout period.

Figure 6:
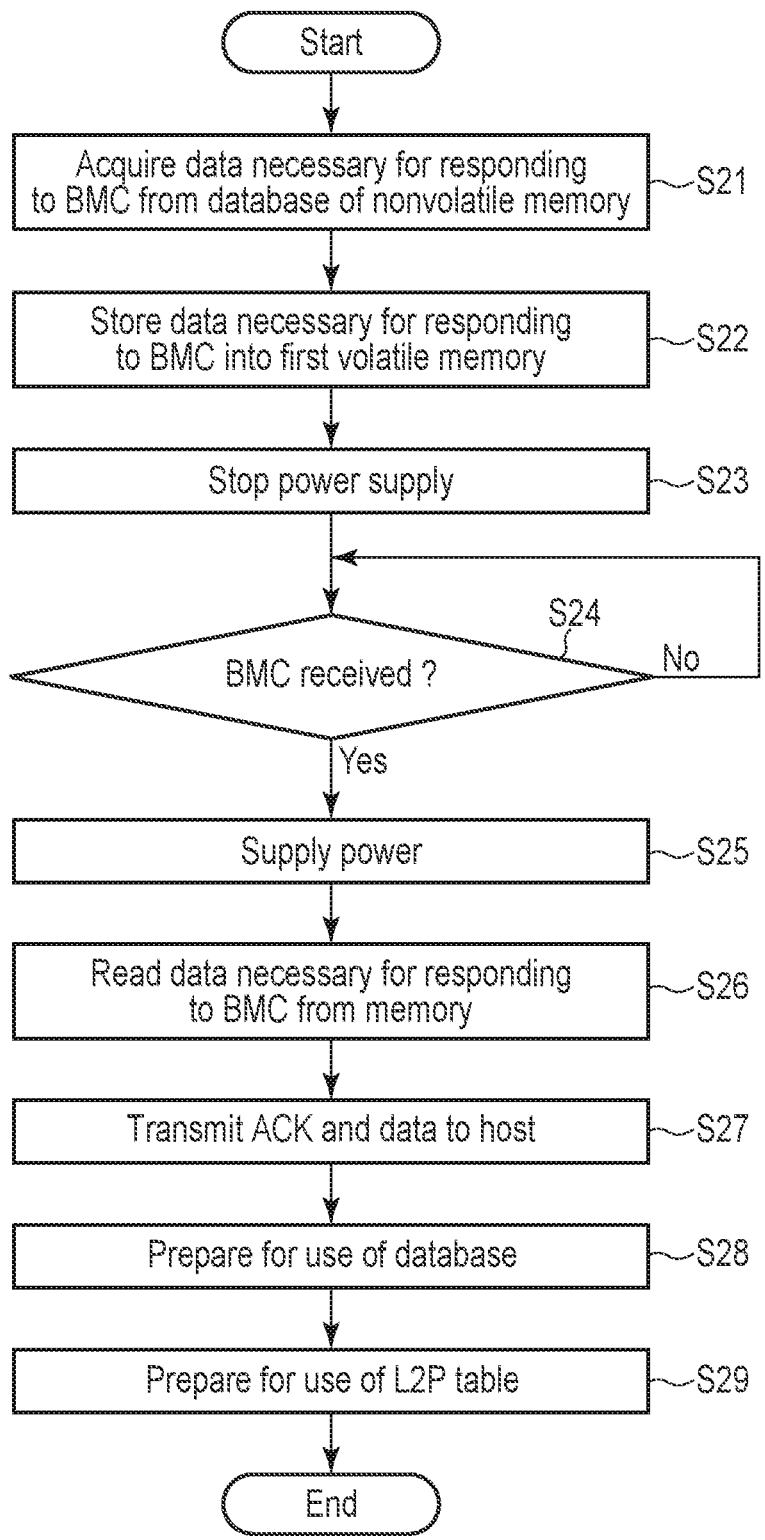
FIG. 6 is a flowchart illustrating a procedure of the transition process and a procedure of the restore process executed in the memory system according to the embodiment of the present invention.

Next, a mode control process according to the embodiment of the present invention will be described. FIG. 6 is a flowchart illustrating a procedure of the transition process and a procedure of the restore process executed in the memory system according to the embodiment of the present invention.

When the transition to the low power mode is instructed by the set feature command or the time of the idle status reaches the threshold time (starts), the controller 4 refers to the database 51 of the nonvolatile memory 5. Then, the controller 4 acquires data necessary for responding to the BMC from the database 51 of the nonvolatile memory 5 (S21).

The controller 4 stores the data acquired in S21 in the first volatile memory 161 (S22).

After storing the data acquired in S21 into the first volatile memory 161, the controller 4 stops the supply of power to the nonvolatile memory 5, the RAM 6, and each of the components of the controller 4 except for the first interface circuit 111, the second interface circuit 112, and the first volatile memory 161 (S23). As a result, the memory system 3 transitions from the normal mode to the low power mode (sixth power state PS5). Even when the memory system 3 transitions to the low power mode, power is supplied to the second interface circuit 112. Accordingly, the second interface circuit 112 can receive the BMC via the second bus 9, such as the SMBus.

When a signal is received via the second bus 9, the controller 4, that is, the second interface circuit 112 determines whether the BMC is received (S24).

When the BMC is not received (No in S24), the controller 4 returns to the process in S24. When signal is received via the second bus 9, the controller 4, that is, the second interface circuit 112 determines whether the BMC is received (S24).

When the BMC is received (Yes in S24), the controller 4 supplies power to each component of the controller 4, the nonvolatile memory 5, and the RAM 6 (S25).

The controller 4 reads, from the first volatile memory 161, data necessary for responding to the BMC received in S24 (S26).

Then, the controller 4 transmits the ACK indicating the normal response and the data read in S26 to the host 2 via the second bus 9 such as SMBus (S27).

When the ACK indicating the normal response and the data read in S26 are transmitted to the host 2, the controller 4 makes the database 51 available for use by preparing for use of the database 51 (S28).

When the database 51 becomes available for use, the controller 4 makes the L2P table 53 available for use by preparing for use of the L2P table 53 (S29).

When the database 51 and the L2P table 53 become available for use, the memory system 3 is restored to the normal mode. When the memory system 3 is restored to the normal mode, the controller 4 ends the processing (end).

Next, a case where an I/O command is received by the first interface circuit 111 via the first bus 8 in the low power mode will be described.

When an I/O command is received by the first interface circuit 111 via the first bus 8 in the low power mode, the controller 4 does not need to return a response to the BMC. Therefore, the controller 4 restores the memory system 3 to the normal mode without executing a process of reading data necessary for responding to the BMC from the first volatile memory 161 and a process of transmitting the ACK indicating a normal response and the read data to the host 2 via the second bus 9 such as the SMBus.

Next, a case where a first non-operational power state and a second non-operational power state, which are two types of power states of the non-operational state, are selectively used as the low power mode will be described. The second non-operational power state is a power state having lower power consumption than that of the first non-operational power state.

The first non-operational power state is a power state in which the supply of power to at least the nonvolatile memory 5 is maintained. The first non-operational power state is, for example, the fourth power state PS3 or the fifth power state PS4.

The second non-operational power state is a power state in which the supply of power to each component of the controller 4 except for the first interface circuit 111, the second interface circuit 112, and the first volatile memory 161 is stopped and the supply of power to the nonvolatile memory 5 is stopped. The second non-operational power state is, for example, the sixth power state PS5.

A case where a power state designated by the host 2 as the low power mode which the memory system 3 is caused to transition to is the first non-operational power state will be considered. In this case, even if the memory system 3 transitions to the low power mode, the supply of power to the nonvolatile memory 5 is maintained. Therefore, data necessary for responding to the BMC can be acquired relatively quickly from the database 51 of the nonvolatile memory 5. Accordingly, when a power state designated by the host 2 as the low power mode is the first non-operational power state, the controller 4 omits execution of the following two operations.

(1) Operation of acquiring data indicating the status of the memory system 3 from the database 51 of the nonvolatile memory 5
(2) Operation of storing the acquired data into the first volatile memory 161

This makes it possible to reduce the amount of processing required to be executed before transitioning to the low power mode. As a result, reliability for the operation of the controller 4 can be improved. In addition, the time required for transition to the low power mode can be reduced.

Next, a case where the controller 4 receives the BMC from the host 2 while the memory system 3 is in the second non-operational power state will be described.

In this case, the controller 4 starts a process of restoring the memory system 3 to the normal mode by restarting the supply of power to each of hardware. Then, when the CPU 12 loads and starts the firmware, the controller 4 becomes accessible to the first volatile memory 161.

When the controller 4 becomes accessible to the first volatile memory 161, the controller 4 reads data indicating the status of the memory system 3 from the first volatile memory 161.

Next, a case where the controller 4 receives the BMC while the memory system 3 is in the first non-operational power state will be described.

In this case, the controller 4 starts a process of restoring the memory system 3 to the normal mode. When the controller 4 becomes accessible to the database 51 of the nonvolatile memory 5, the controller 4 reads data indicating the status of the memory system 3 from the database 51 of the non-volatile memory 5. In the first non-operational power state, the supply of power to the nonvolatile memory 5 is maintained. Therefore, as soon as the process of restoring the memory system 3 to the normal mode is started, the controller 4 can access the database 51 of the nonvolatile memory 5.

Next, details of processing executed by the controller 4 before transitioning to the low power mode will be described. FIG. 7 is a flowchart illustrating a procedure of processing to be executed in the memory system before transitioning to the low power mode according to the embodiment of the present invention.

When the transition to the low power mode is instructed by the set feature command, or when the time of the idle state reaches the threshold time (start), the controller 4 determines whether or not a power state designated as the low power mode is the sixth power state PS5 (S31).

When the designated power state is the sixth power state PS5 (Yes in S31), the controller 4 acquires data necessary for responding to the basic management command (BMC) from the database 51 of the nonvolatile memory 5 (S32).

The controller 4 stores the data necessary for responding to the BMC acquired in S32 into the first volatile memory 161 (S33).

Thereafter, the controller 4 stops the supply of power to the nonvolatile memory 5, the RAM 6, and each of the components of the controller 4 except for the first interface circuit 111, the second interface circuit 112, and the first volatile memory 161 (S34). As a result, the memory system 3 transitions to the low power mode. Then, the controller 4 ends the process (end).

When the designated power state is not the sixth power state PS5 (No in S31), that is, when the designated power state is the fourth power state PS3 or the fifth power state PS4, the controller 4 executes processing for causing the memory system 3 to transition to the low power mode (the fourth power state PS3 or the fifth power state PS4) (S34). In the fourth power state PS3 or the fifth power state PS4, the supply of power to at least the nonvolatile memory is maintained. Then, the controller 4 ends the process (end).

Figure 8:
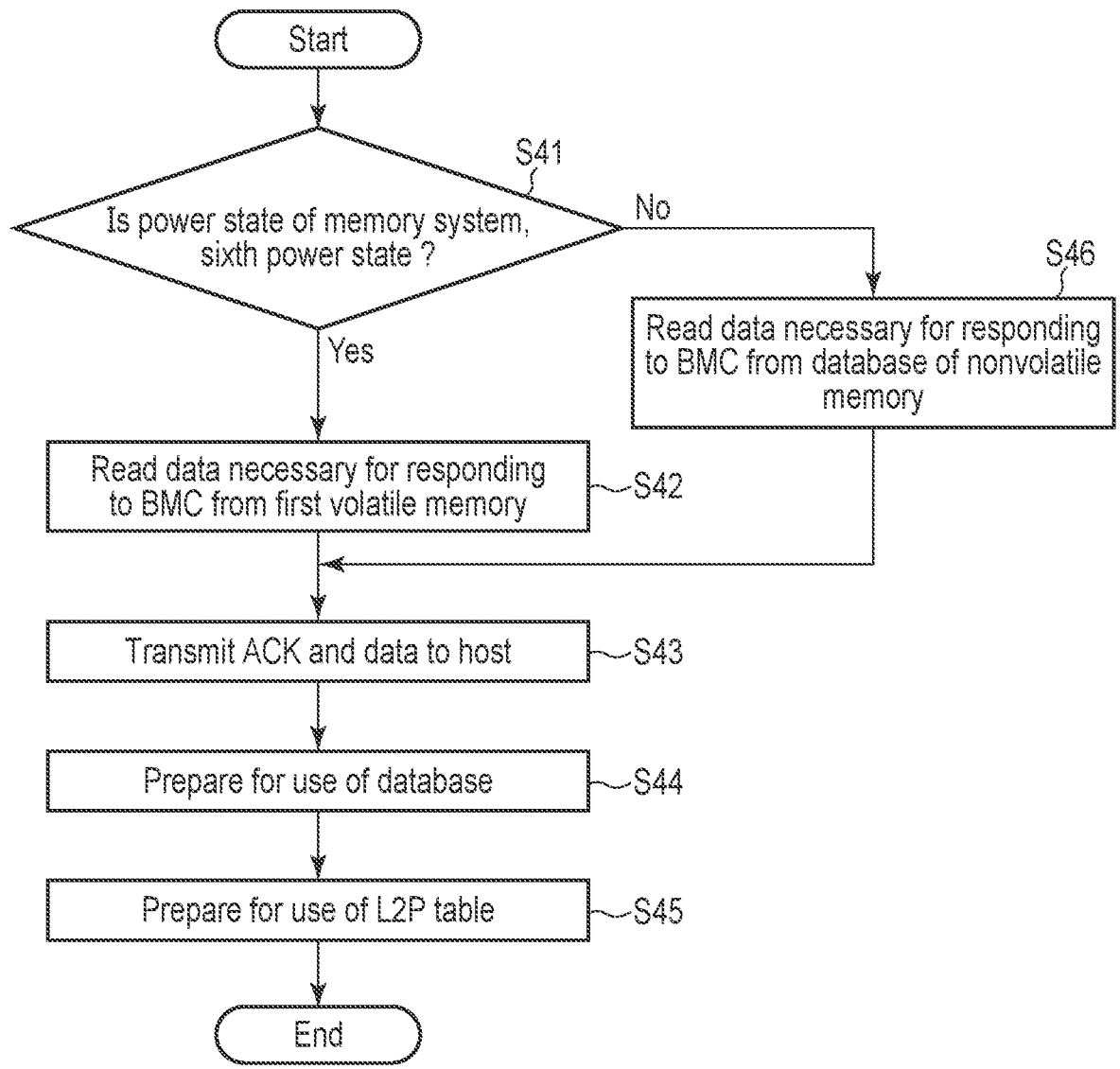
FIG. 8 is a flowchart illustrating a procedure of the restore process to be executed when basic management command (BMC) is received from a host while being in the low power mode in the memory system according to the embodiment of the present invention.

Next, details of processing executed by the controller 4 when receiving the BMC during the low power mode will be described. FIG. 8 is a flowchart illustrating a procedure of the restore process to the normal mode, which is executed in the memory system according to the embodiment of the present invention when the BMC is received while being in the low power mode.

When the BMC is received by the second interface circuit 112 while the memory system 3 is in the low power mode (start), the controller 4 determines whether the current power state of the memory system 3 is the sixth power state PS5 (S41).

When the current power state of the memory system 3 is the sixth power state PS5 (Yes in S42), the controller 4 reads data necessary for responding to the BMC from the first volatile memory 161 (S42).

The controller 4 transmits the ACK indicating the normal response and the data read in S42 to the host 2 via the second bus 9 such as the SMBus (S43).

When the ACK indicating the normal response and the data read in S42 are transmitted to the host 2, the controller 4 makes the database 51 available for use by preparing for use of the database 51 (S44).

When the database 51 becomes available for use, the controller 4 makes the L2P table 53 available for use by preparing for use of the L2P table 53 (S45).

When the database 51 and the L2P table 53 become available for use, the memory system 3 is restored to the normal mode. When the memory system 3 is restored to the normal mode, the controller 4 ends the processing (end).

When the current power state of the memory system 3 is a power state other than the sixth power state PS5 (No in S41), the controller 4 reads data necessary for responding to the BMC from the database 51 of the nonvolatile memory 5 (S46).

Then, the controller 4 transmits the ACK indicating the normal response and the data read in S46 to the host 2 via the second bus 9 such as the SMBus (S43).

As described above, according to the present embodiment, data indicating the status of the memory system 3 can be acquired in a shorter time than that when reading the data from the database 51 of the nonvolatile memory 5. Therefore, it is possible to shorten the time from the reception of the management command to the acquisition of the data necessary for responding to the management command. Therefore, when the management command is received in the status of transition to the low power mode, a response to the management command can be normally transmitted to the host 2 within the timeout period defined in the SMBus standard, which is used as the second bus 9.

The embodiments are examples, and the scope of the invention is not limited thereto.

Next, a response process executed by the memory system according to the comparative example will be described. FIG. 9 is a sequence diagram illustrating a transition process and a restore process to be executed in a memory system according to the comparative example.

When a transition to a low power mode (sixth power state PS5) is instructed by a set feature command transmitted from a host, a controller of the memory system according to the comparative example starts a transition process of transitioning the memory system to the low power mode (S51). In addition, when the time of an idle state reaches a threshold time for transitioning to the low power mode (sixth power state PS5), the transition process is also started.

In the transition process, the controller causes the memory system to transition to the low power mode by a process of stopping supply of power to each component of the memory system, or the like (S52).

When the transition process is completed (S53), the supply of power to almost all the components in the controller except for a circuit necessary for the restore process to the normal mode and the supply of power to a nonvolatile memory are stopped.

Thereafter, when a BMC transmitted from a host via an SMBus is received by a second interface circuit (S54), the controller starts the restore process (S55). As the restore process, the controller controls a power supply circuit so that the supply of power to each component of the memory system including the nonvolatile memory is restarted. For example, the supply of power to the nonvolatile memory is also restarted.

As a response to the BMC received in S54, the controller transmits a NACK indicating that a response is impossible to the host (S56). That is, the controller notifies the host that a response is impossible by transmitting the NACK to the host. This is because in the SMBus standard, it is required to return a response within a limited time (timeout period) from reception of a command. In order to transmit a normal response to the BMC, the controller needs to obtain data indicating a status of the memory system from a database of the nonvolatile memory within a timeout period from reception of the BMC. However, the time from when the supply of power to the nonvolatile memory is restarted until when the database of the nonvolatile memory becomes available may be longer than the timeout time of the SMBus.

Therefore, the controller sends the NACK indicating that a response is impossible to the host without waiting for the database to become available for use. By sending the NACK to the host, it is possible to prevent a timeout error of the SMBus from occurring. However, the data indicating the status of the memory system cannot be reported to the host.

After transmitting the NACK to the host, the controller prepares for use of the database (S57). The controller makes the database available for use by acquiring information on the database of the nonvolatile memory.

Then, the controller prepares for use of an L2P table (S58). The controller acquires information on the L2P table of the nonvolatile memory, thereby making the L2P table available for use.

When the database and the L2P table become available for use, the controller completes the restore process (Step S59).

Next, an operation of returning the NACK to the host will be described. FIG. 10 is a schematic diagram illustrating the basic management command (BMC) transmitted from the host according to a comparative example and the NACK (a response is not possible) transmitted from the memory system according to the comparative example.

Each time each of the address write "Addr-w" and the command code "Cmd Code" transmitted from the host after "Start" is received, the controller of the memory system according to the comparative example transmits an ACK to the host. Then, when the address read "Addr-r" is received, the controller of the memory system according to the comparative example transmits the NACK to the host.

When receiving the NACK, the host transmits "Stop" to the memory system according to the comparative example. As a result, a block read protocol is terminated.

As described above, the memory system according to the comparative example acquires data indicating the status of the memory system from the database of the nonvolatile memory. The time from when the supply of power to the nonvolatile memory is restarted until when the database of the nonvolatile memory becomes available for use is relatively long. Therefore, when the BMC is received in the low power mode in which the supply of power to the nonvolatile memory is stopped, a response cannot be returned within the timeout period.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host via each of a first bus and a second bus, the memory system comprising:
   a nonvolatile memory; and
   a controller configured to execute, via the first bus, communication related to an I/O command with the host for writing or reading data to or from the nonvolatile memory, and execute, via the second bus, communication related to a management command with the host for acquiring a status of the memory system, wherein
   the controller is configured to:
   acquire, from the nonvolatile memory, first data that is necessary for responding to a management command for acquiring a status of the memory system before causing the memory system to transition from a normal mode in which the I/O command and the management command received from the host are processed to a low power mode in which the I/O command and the management command are not processed, the first data indicating the status of the memory system, and store the acquired first data in a first volatile memory included in the controller;
   cause the memory system to transition from the normal mode to the low power mode by stopping supply of power to each of components of the controller except for a first interface circuit that communicates with the host via the first bus, a second interface circuit that communicates with the host via the second bus, and the first volatile memory and stopping the supply of power to the nonvolatile memory after storing the acquired first data in the first volatile memory; and
   when the management command is received by the second interface circuit via the second bus while the memory system is in the low power mode, start a process of restoring the memory system to the normal mode by restarting the supply of power to each of the components of the controller and the supply of power to the nonvolatile memory, and when the controller becomes accessible to the first volatile memory, read the first data from the first volatile memory and transmit the read first data to the host over the second bus.

2. The memory system according to claim 1, wherein
   a power state of the memory system available in the low power mode includes at least a first non-operational power state and a second non-operational power state having lower power consumption than that of the first non-operational power state;

the first non-operational power state is a power state in which the supply of power to at least the nonvolatile memory is maintained, and the second non-operational power state is a power state in which the supply of power to each of the components of the controller except for the first interface circuit, the second interface circuit, and the first volatile memory is stopped, and the supply of power to the nonvolatile memory is stopped; and the controller is configured to:

execute, when a power state designated by the host as the low power mode to which the memory system should transition is the second non-operational power state, a first operation of acquiring the first data from the nonvolatile memory and a second operation of storing the acquired first data in the first volatile memory before causing the memory system to transition from the normal mode to the low power mode; and cause, when the power state designated by the host is the first non-operational power state, the memory system to transition from the normal mode to the low power mode without performing the first operation and the second operation when the power state designated by the host is the first non-operational power state.

3. The memory system according to claim 2, wherein the controller is configured to:

when the management command is received by the second interface circuit via the second bus while the memory system is in the second non-operational, start a process of restoring the memory system to the normal mode, and when the controller becomes accessible to the first volatile memory, read the first data from the first volatile memory; and start a process of restoring the memory system to the normal mode when the management command is received by the second interface circuit via the second bus while the memory system is in the first non-operational power state, and read the first data from the nonvolatile memory when the controller becomes accessible to the nonvolatile memory.

4. The memory system according to claim 1, wherein the second bus is a system management bus, and the management command is a basic management command defined in a NVMe-MI standard.

5. The memory system according to claim 4, wherein the first bus is a PCIe bus, and communication related to an NVM command defined in the NVMe standard, the NVM command including the I/O command, and communication related to an admin command defined in the NVMe standard are executed via the first bus.

6. The memory system according to claim 1, wherein each of the first interface circuit and the second interface circuit is configured to transmit a wake-up signal to a power supply circuit included in the memory system in response to receiving a command from the host while the memory system is in the low power mode.

7. A method of controlling a memory system connectable to a host via each of a first bus and a second bus, the memory system including a nonvolatile memory, and a controller configured to execute, via the first bus, communication related to an I/O command with the host for writing or reading data to or from the nonvolatile memory, and execute, via the second bus, communication related to a management command with the host for acquiring a status of the memory system, the method comprising:

acquiring first data from the nonvolatile memory, the first data being necessary for responding to a management command for acquiring a status of the memory system, before causing the memory system to transition from a normal mode in which the I/O command and the management command received from the host are processed to a low power mode in which the I/O command and the management command are not processed, the first data indicating the status of the memory system, and storing the acquired first data in a first volatile memory included in the controller; and causing the memory system to transition from the normal mode to the low power mode by stopping supply of power to each of components of the controller except for a first interface circuit that communicates with the host via the first bus, a second interface circuit that communicates with the host via the second bus, and the first volatile memory and stopping the supply of power to the nonvolatile memory after storing the acquired first data in the first volatile memory; and when the management command is received by the second interface circuit via the second bus while the memory system is in the low power mode, starting a process of restoring the memory system to the normal mode by restarting the supply of power to each of the components of the controller and the supply of power to the nonvolatile memory, and when the controller is accessible to the first volatile memory, reading the first data from the first volatile memory, and transmitting the read first data to the host via the second bus.

8. The method according to claim 7, wherein power states of the memory system available for use in the low power mode including at least a first non-operational power state and a second non-operational power state having lower power consumption than that of the first non-operational power state, the first non-operational power state being a power state in which the supply of power to at least the nonvolatile memory is maintained, and the second non-operational power state is a power state in which the supply of power to each of the components of the controller except for the first interface circuit, the second interface circuit, and the first volatile memory is stopped, and the supply of power to the nonvolatile memory is stopped, the method further comprises:

executing, when a power state designated by the host as the low power mode to which the memory system should transition is the second non-operational power state, a first operation of acquiring the first data from the nonvolatile memory and a second operation of storing the acquired first data in the first volatile memory before causing the memory system to transition from the normal mode to the low power mode; and causing, when the power state designated by the host is the first non-operational power state, the memory system to transition from the normal mode to the low power mode without executing the first operation and the second operation.

9. The method according to claim 8, the method further comprising:

starting a process of restoring the memory system to the normal mode when the management command is received by the second interface circuit via the second bus while the memory system is in the second non-operational power state, and reading the first data from the first volatile memory when the controller becomes accessible to the first volatile memory; and starting a process of restoring the memory system to the normal mode when the management command is received by the second interface circuit via the second bus while the memory system is in the first non-operational power state, and reading the first data from the nonvolatile memory when the controller becomes accessible to the nonvolatile memory.

10. The method according to claim 7, wherein the second bus is a system management bus, and the management command is a basic management command defined in a NVMe-MI standard.

11. The method according to claim 10, wherein the first bus is a PCIe bus, and communication related to an NVM command defined in the NVMe standard, the NVM command including the I/O command, and communication related to an admin command defined in the NVMe standard are executed via the first bus.

\* \* \* \* \*